(12) United States Patent
Ziv et al.

(10) Patent No.: US 10,035,471 B2
(45) Date of Patent: Jul. 31, 2018

(54) CARRIER DEVICE FOR VEHICLES

(71) Applicants: Assaph Ziv, Raanana (IL); Yariv Ziv, Warsaw (PL)

(72) Inventors: Assaph Ziv, Raanana (IL); Yariv Ziv, Warsaw (PL)

( * ) Notice: Subject to any disclaimer, the term of this patent is extended or adjusted under 35 U.S.C. 154(b) by 60 days.

(21) Appl. No.: 15/022,213

(22) PCT Filed: Sep. 16, 2014

(86) PCT No.: PCT/IL2014/050825
§ 371 (c)(1),
(2) Date: Mar. 16, 2016

(87) PCT Pub. No.: WO2015/037008
PCT Pub. Date: Mar. 19, 2015

(65) Prior Publication Data
US 2016/0229350 A1    Aug. 11, 2016

Related U.S. Application Data

(60) Provisional application No. 61/878,334, filed on Sep. 16, 2013.

(51) Int. Cl.
*B60R 9/10* (2006.01)
*B60R 9/06* (2006.01)

(52) U.S. Cl.
CPC . *B60R 9/10* (2013.01); *B60R 9/06* (2013.01)

(58) Field of Classification Search
CPC ..................................... B60R 9/06; B60R 9/10
USPC ........................................................ 224/329
See application file for complete search history.

(56) References Cited

U.S. PATENT DOCUMENTS

| 3,794,227 A |   | 2/1974  | Stearns                |
|-------------|---|---------|------------------------|
| 5,361,959 A | * | 11/1994 | Allen ........... B60R 9/06 224/314 |
| 5,495,970 A | * | 3/1996  | Pedrini .......... B60R 9/06 211/17 |
| 5,628,440 A | * | 5/1997  | Gallazzini ...... B60R 9/10 224/309 |
| 5,752,640 A | * | 5/1998  | Proulx ........... B60R 9/06 224/314 |

(Continued)

FOREIGN PATENT DOCUMENTS

| EP | 1686009 A2   | 8/2006 |
|----|--------------|--------|
| WO | 1998/005531 A | 2/1998 |
| WO | 2002/14108 A1 | 2/2013 |

*Primary Examiner* — Peter Helvey
(74) *Attorney, Agent, or Firm* — Edward Langer Adv & Patent Attorney

(57) ABSTRACT

The present invention provides a carrier device for carrying a load, said carrier device is configured for clamping to a trunk of a vehicle and for loading a load thereto for carrying thereof The carrier device comprising: at least one inner part configured for clamping the vehicle trunk, creating an anchor point for supporting an external part; and at least one external part for holding said load, said external part connects to said at least one inner part via at least one anchor connector supported by said anchor point, where said external part includes at least one main support sub-assembly having at least one support element pressed against to the lower bumper of the vehicle and an arc support sub-assembly having an upper arc to be pressed against the upper rear part of the vehicle.

18 Claims, 20 Drawing Sheets

(56) References Cited

U.S. PATENT DOCUMENTS

| | | | |
|---|---|---|---|
| 6,422,443 B1 | 7/2002 | Erickson et al. | |
| 8,839,997 B2* | 9/2014 | Lundgren | B60R 9/058 |
| | | | 224/309 |
| 2002/0117524 A1* | 8/2002 | Jeong | B60R 9/06 |
| | | | 224/314 |
| 2006/0163298 A1* | 7/2006 | Watson | B60R 9/06 |
| | | | 224/325 |
| 2008/0110984 A1 | 5/2008 | Huang | |
| 2010/0193555 A1* | 8/2010 | Gift | B60R 9/08 |
| | | | 224/321 |

* cited by examiner

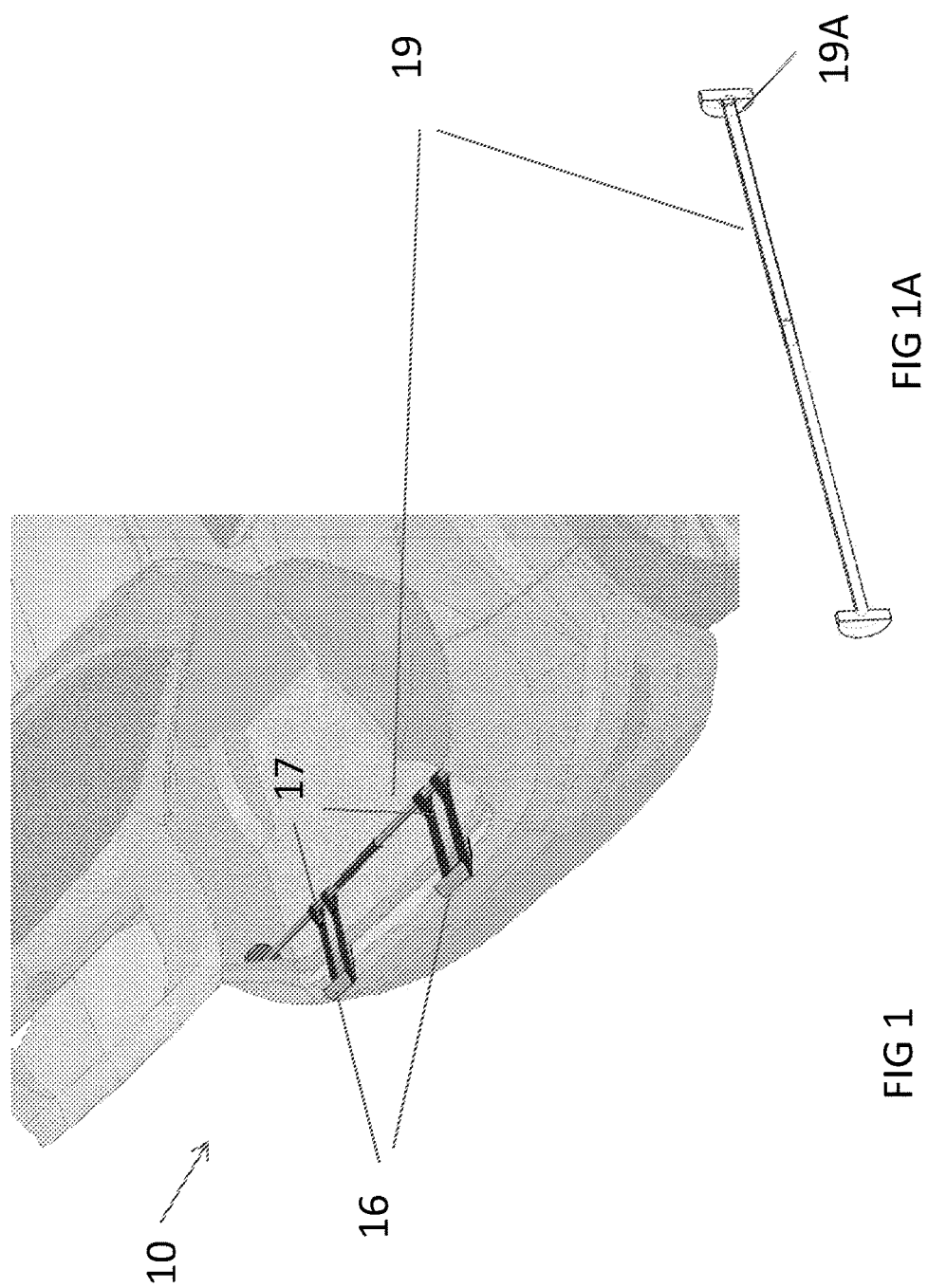

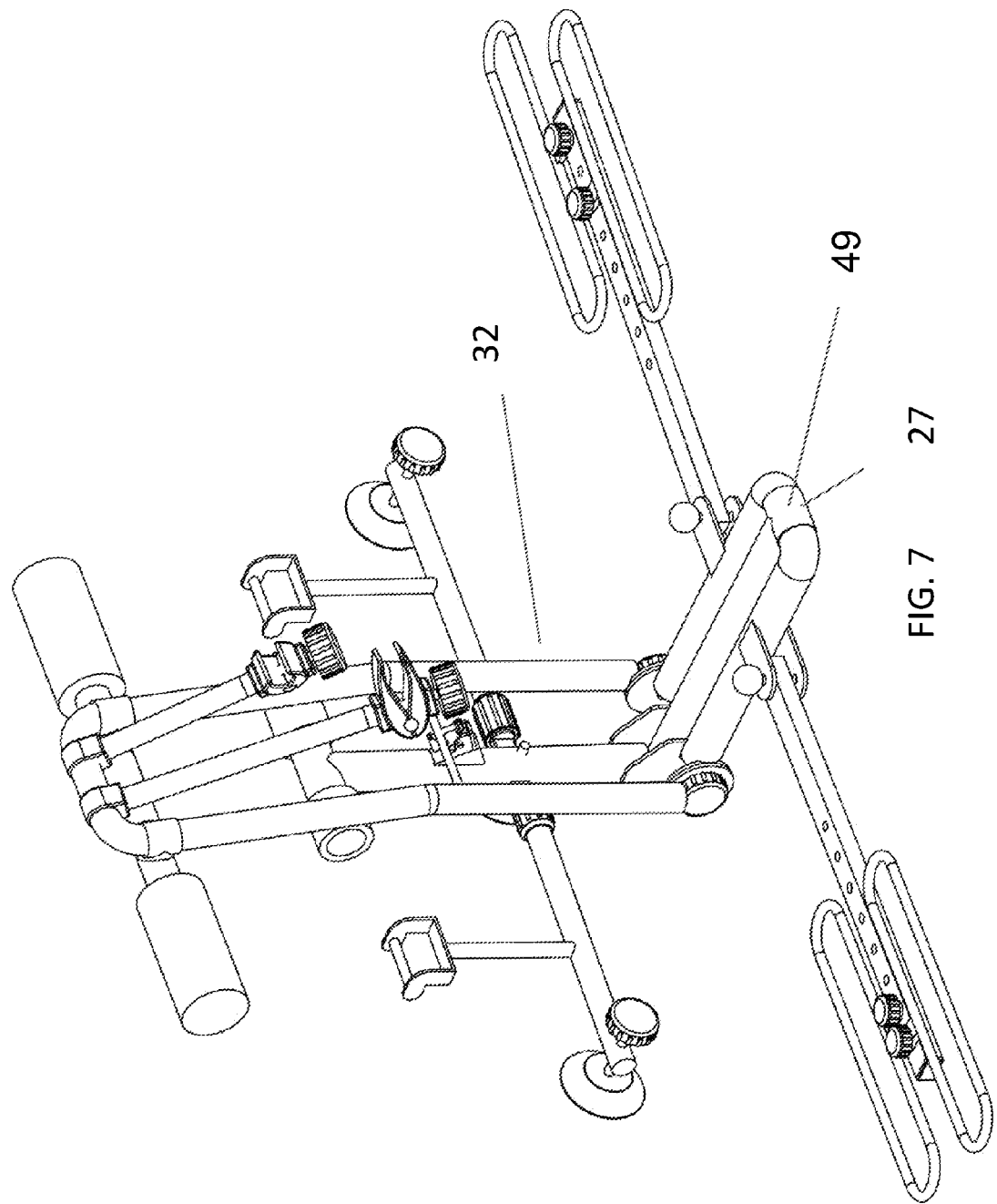

CARRIER DEVICE FOR VEHICLES

FIELD OF THE INVENTION

The present invention relates to a carrier for bicycle or any other freight at about the same size and weight, mounted on a car. More specifically, the invention comprises a carrier which can be fixed to the rear end of the car with no straps or cables to the car rear door and without interfering with the rear door or trunk door.

BACKGROUND OF THE INVENTION

There are three kinds of bicycle carriers in the market:
a. Roof mounted
b. Rear door mounted
c. Hitch mounted The roof mounted type are the most popular, and provide a very good solution for mounting the bikes to the carrier, as they secure the bicycle by three points, one on each wheel and a third one on the bicycle frame. Its major drawback is the height needed to lift the bicycle when loading. Another problem is a lack of option to simply disassemble the carrier, for car washing or for preventing wind turbulence around the roof rack.

The rear door mounted carriers are fixed to the rear door or trunk door with cables or straps. This type can be adapted easily to different kinds of cars. The carriers are compact, and can be disassembled and left at the car trunk, leaving enough room for other stuff.

They have three main disadvantages: the first is the difficulty to secure the bicycle to the carrier; the second is poor attachment of the bikes to the carrier (which might cause scratching); and thirdly—the height needed to load the bicycle (above shoulder height) in most of car models. In these carriers, there is no option to load other freight other than bicycle.

The hitch bar carriers are the most convenient to transport bikes or other freights. They can be secured tightly, in a similar way as the roof mounted carriers and even better. Their main advantage is that there is no need to lift them above the shoulder. They are very easy to assemble and disassemble, and are compatible for different types of freight. Their main disadvantage is the need to install the hitch bar on the car body, which is an expensive procedure, and cannot be transferred from car to car. Accordingly these carriers are not popular for private cars.

The present invention includes all the advantages of the hitch type carrier mentioned above, but does not require installation of the hitch itself. This makes it cheaper, easy to assemble and disassemble, and thereby compatible to transfer from car to car.

SUMMARY OF THE INVENTION

The present invention discloses a carrier device for carrying a load, said carrier device is configured for clamping to a trunk of a vehicle and for loading a load thereto for carrying thereof The carrier device comprising: at least one inner part configured for clamping the vehicle trunk, creating an anchor point for supporting an external part; and at least one external part for holding said load, said external part connects to said at least one inner part via at least one anchor connector supported by said anchor point, where said external part includes at least one main support sub-assembly having at least one support element pressed against to the lower bumper of the vehicle and an arc support sub-assembly having an upper arc to be pressed against the upper rear part of the vehicle.

According to some embodiments of the present invention the main support subassembly and the arc support subassembly are interconnected partly via rotatable axis, such that the support arch assembly, is rotated and locked to the main support subassembly, thus pressing the upper arc of the arc sub-assembly against the upper rear part the vehicle.

According to some embodiments of the present invention the device further comprises a lock mechanism between the main support subassembly and the arc support subassembly.

According to some embodiments of the present invention the arc support sub assembly is comprised of two U shaped rods interconnected by a rotatable axis, enabling the folding of the carrier unit.

According to some embodiments of the present invention the main support sub assembly comprises at least one connector unit for engaging to at least one anchor connector, wherein the location of said at least one connector unit can be adjusted.

According to some embodiments of the present invention the main support sub assembly comprises a lower horizontal pipe having a hollow vertical pipe at the edge, said a hollow vertical pipe engages with a hollow pipe of the arc sub assembly, thus creating a rotatable axis between the main support sub assembly and the arc support assembly.

According to some embodiments of the present invention the main support sub assembly comprises a vertical bar having a T shaped edge, covered by soft material for supporting the arc subassembly.

According to some embodiments of the present invention the main support sub assembly further comprises one at least one middle horizontal bar, connected vertically to the vertical bar, wherein on said middle horizontal bar are installed the support elements which are pressed against to the lower bumper of the vehicle and at least one connector element which engage at least one anchor connector.

According to some embodiments of the present invention the inner part includes at least one strap attached on one end to the connector on the second end to an inner support element pressed against an inner back wall of the vehicle.

According to some embodiments of the present invention the inner support element is a stretching elongated rod, designed to be to fit in the vehicle trunk, such as the rod is pressed against the rear inner wall of the trunk.

According to some embodiments of the present invention the inner support is connected to a part of the vehicle body.

According to some embodiments of the present invention the connector is a bracket design to fit in and pressed against the rubber trunk lid seal installed on the vehicle trunk edge.

According to some embodiments of the present invention the anchor connector is a bracket design to fit in on the vehicle trunk edge.

According to some embodiments of the present invention the anchor connector is located outside the vehicle.

According to some embodiments of the present invention the arch support sub assembly comprise at least one connector designed to be engaged to a bicycle.

According to some embodiments of the present invention the arch support sub assembly comprise at least one bar designed support at least one bicycle wheel.

According to some embodiments of the present invention the inner part and anchor connectors are one part of bracket designed to fit on the vehicle trunk edge.

A carrier device for carrying a load, said carrier device is configured for clamping to a trunk of a vehicle and for loading a load thereto for carrying thereof, said carrier comprising:
at least one external part for holding said load, said external part connects to at least one anchor point installed on the edge of the vehicle, where said external part includes at least one main support sub-assembly having at least one support element pressed against to the lower bumper of the vehicle and an arc support sub-assembly having an upper arc to be pressed against the upper rear part of the vehicle.

A carrier device for carrying a load, said carrier device is configured for clamping to a trunk of a vehicle and for loading a load thereto for carrying thereof, the carrier device comprising:
at least one inner part configured for clamping the vehicle trunk, creating an anchor point for supporting an external part;
wherein the inner part includes at least one strap attached on one end to the anchor point on the second end to an inner support element pressed against an inner back wall of the vehicle.

A carrier device for carrying a load, said carrier device is configured for clamping to a trunk of a vehicle and for loading a load thereto for carrying thereof. The carrier device comprising:
at least one inner part configured for clamping the vehicle trunk, creating an anchor point for supporting an external part;
wherein the inner part includes at least one bracket attached on one end to the anchor point on the second end to the edge of the vehicle trunk.

BRIEF DESCRIPTION OF THE DRAWINGS

FIG. 1 illustrates a perspective view of carrier unit inner part according to some embodiments of the present invention.

FIG. 1A illustrates a perspective view of the stretching elongated rod according to some embodiments of the present invention.

FIG. 4A illustrates cross section view of metal bracket according to some embodiments of the present invention.

FIGS. 7 illustrates a side view of the arc sub assembly and the main support sub assembly in different folding states according to some embodiments of the present invention.

DETAILED DESCRIPTION OF SOME EMBODIMENTS OF THE INVENTION

Working Principle

Figure 1B:
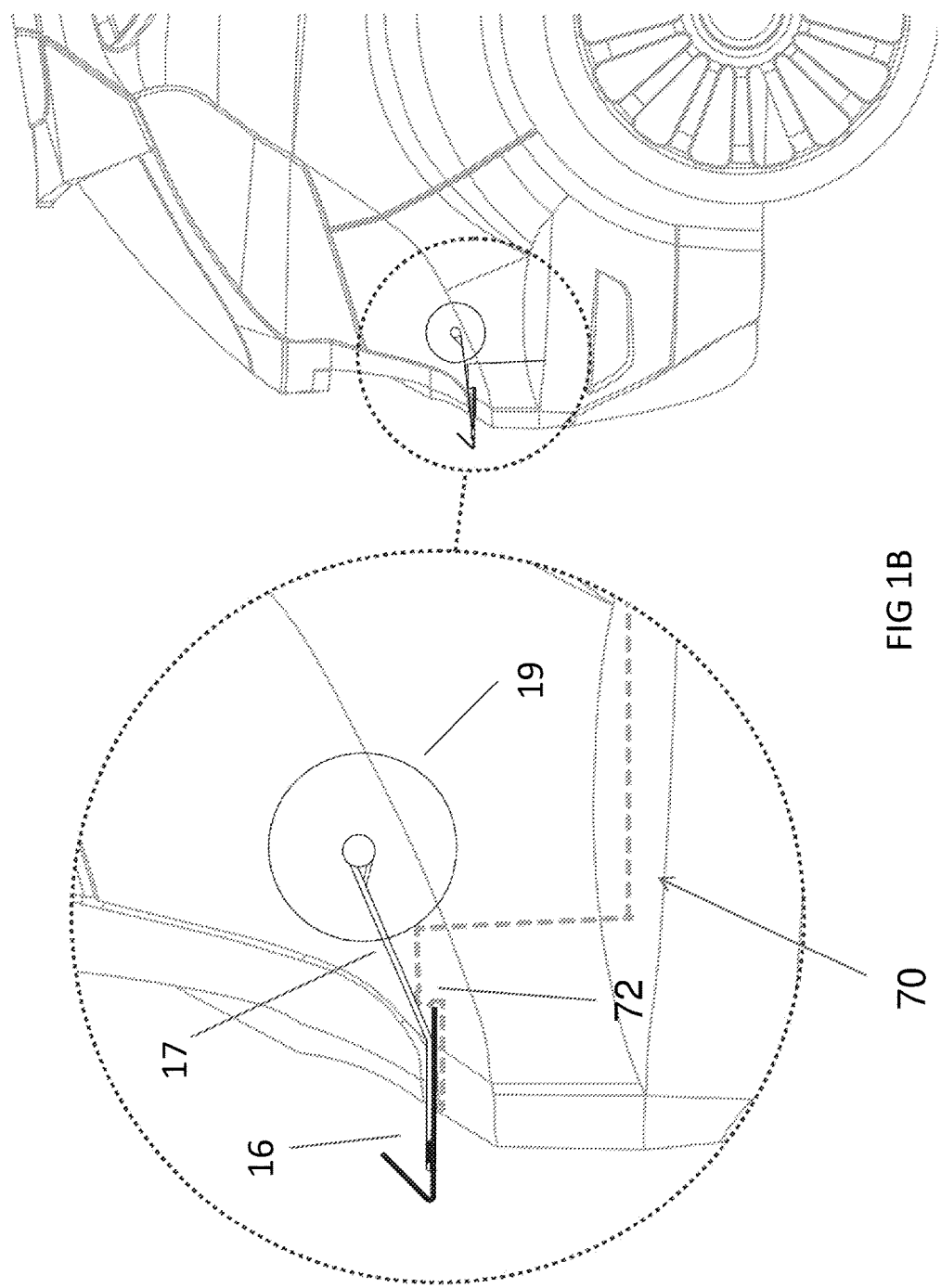
FIG. 1B illustrates a side view of the inner part of the carrier unit engage at the vehicle trunk according to some embodiments of the present invention.

The carrier unit according to the present invention is designed to be attached and fitted to the car structure for preventing any movement of the carrier while the car is in motion. The carrier is connected to the car structure via straps and anchor bracket to the vehicle trunk. Once the carrier is connected to the anchor brackets, the carrier unit can move freely from open position to locked position in the clockwise or anticlockwise directions. As the carrier is pushed down it moves anticlockwise (see FIG. 13) until the support elements leans against the car rear bumper. In order to prevent the movement in the clockwise direction the Support arc 20 (FIG. 7A) is pushed down until the rod 40 engages with the locking mechanism 62. The support arc subassembly 20 is rotatably connected to the main support subassembly 30 in a way that it cause it to move into the car bumper direction (moving anticlockwise) while the support arc is going down. In that manner the carrier is completely locked in its position.

Four Positions Description

The carrier can be set into four different positions:

Loading position (See FIG. 12)—The carrier is installed on the car and ready for loading. The Support arc subassembly 20 is locked together with the main support subassembly 30.

Figure 10:
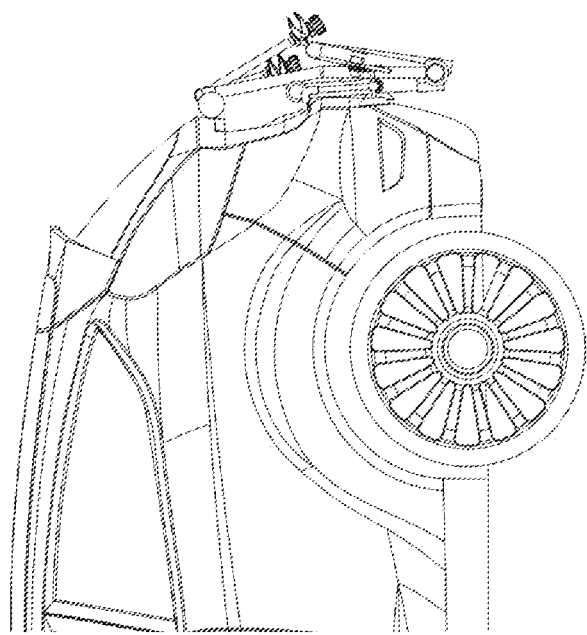
FIG. 10 illustrates perspective view of of carrier unit external part attached to the vehicle in unloaded and locked state according to some embodiments of the present invention.

Driving with no load (See FIG. 10)—The carrier is installed on the car. The Support arc 20 is in locked position. The horizontal part of the Support arc sub-assembly 20 is in folded position (see FIG. 8B)

Trunk door opened (See FIG. 11)—The carrier is installed on the car. The Support arc sub-assembly is unlocked, and is rotatably moved upward (with or without load). The upward position enables the opening of the car trunk door after the carrier was loaded.

Completely folded (See FIG. 9)—The carrier is not installed on the car. All the moving parts are in folded position.

Description

FIG. 1 illustrates a perspective view of carrier unit inner part 10 according to some embodiments of the present invention. The inner part 10 according to this embodiment is comprised of: a pair of straps connected at one end to an inner support element 19 of stretching elongated rod which is designed to fit in the trunk pressed against the inner side walls of the trunk. The inner part is connected to the external part 12 via an anchor connector, implemented in this embodiment as a pair of bracket 16 designed to fit and pressed against the Trunk lid seal installed at the edge of the vehicle trunk at the touching point with trunk door. This structure of the inner part create an anchor point at the edge of the vehicle trunk, for connecting and supporting the external part 12 of the carrier unit as is described below.

FIG. 1A illustrates a cross section perspective view of the stretching elongated rod according to some embodiments of the present invention. The stretching elongated rod is designed with collapsible telescopic rods including thread and screw, enabling to fit the size of different trunks, such as the edges part having soft disc like shape are pressed against the inner side walls of the trunk.

FIG. 1B illustrates a side view of the inner part of the carrier unit engage at the vehicle trunk according to some embodiments of the present invention. This Figure shows the bracket 16, pressed under the trunk lid seal 72, at the edge of the vehicle trunk 70. The strap 17 is connected on one end to the bracket 16, and on the other end to the stretching elongated rod 19, pressed against the inner back wall of the trunk 70

Figure 2:
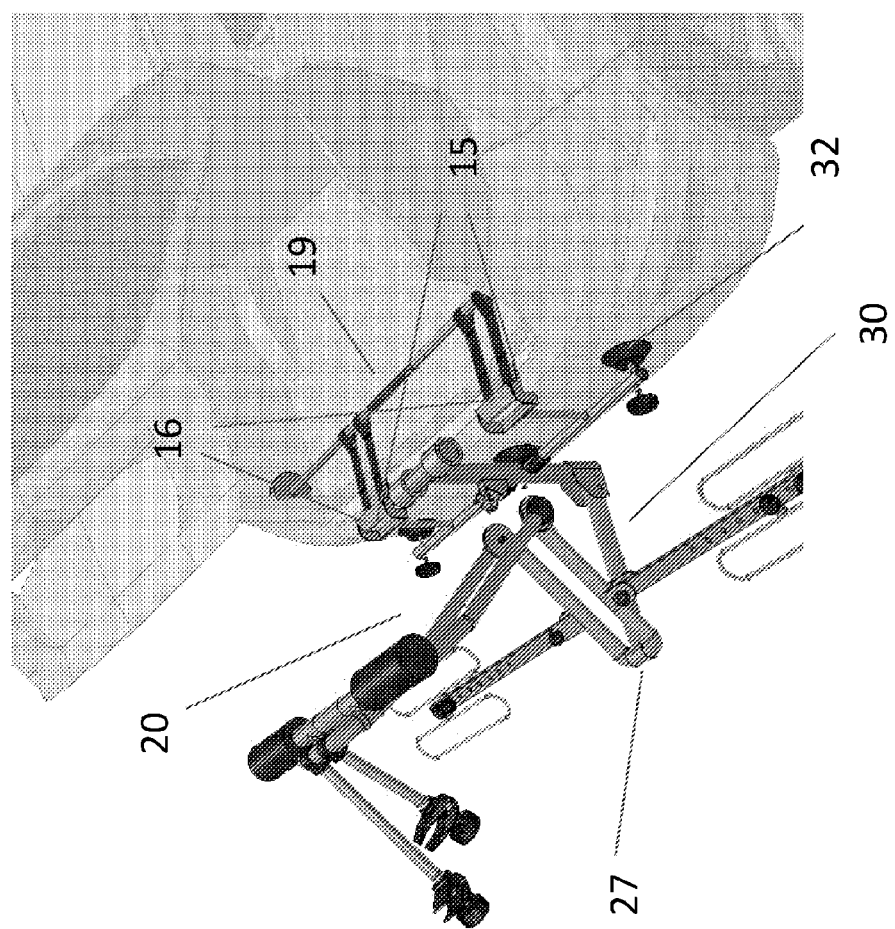
FIG. 2 illustrates a perspective view of the carrier unit where the inner part in installed in the vehicle trunk in unlocked position according to some embodiments of the present invention.
Figure 3:
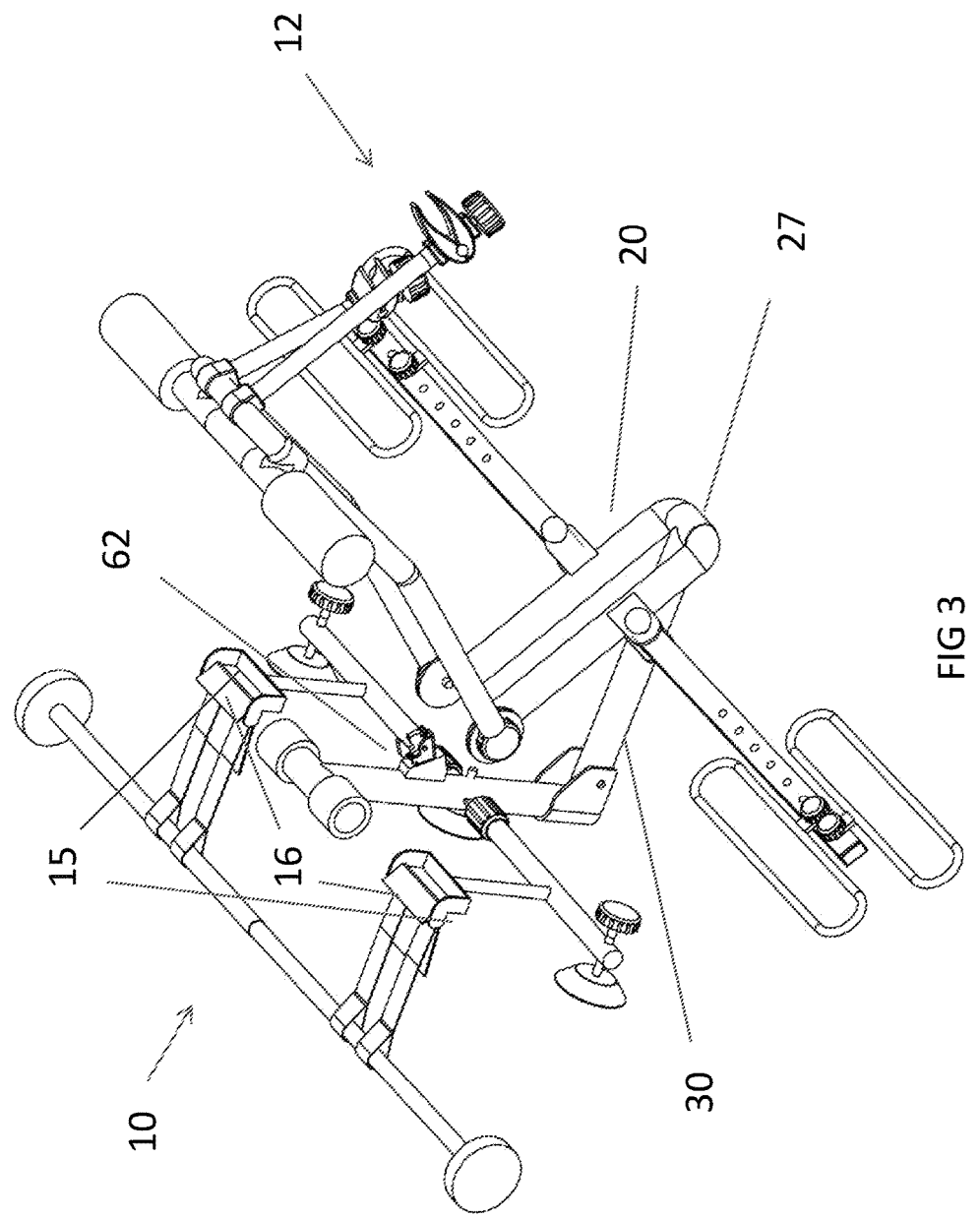
FIG. 3 illustrates perspective view of the inner and external parts of the carrier according to some embodiments of the present invention.
Figure 5:
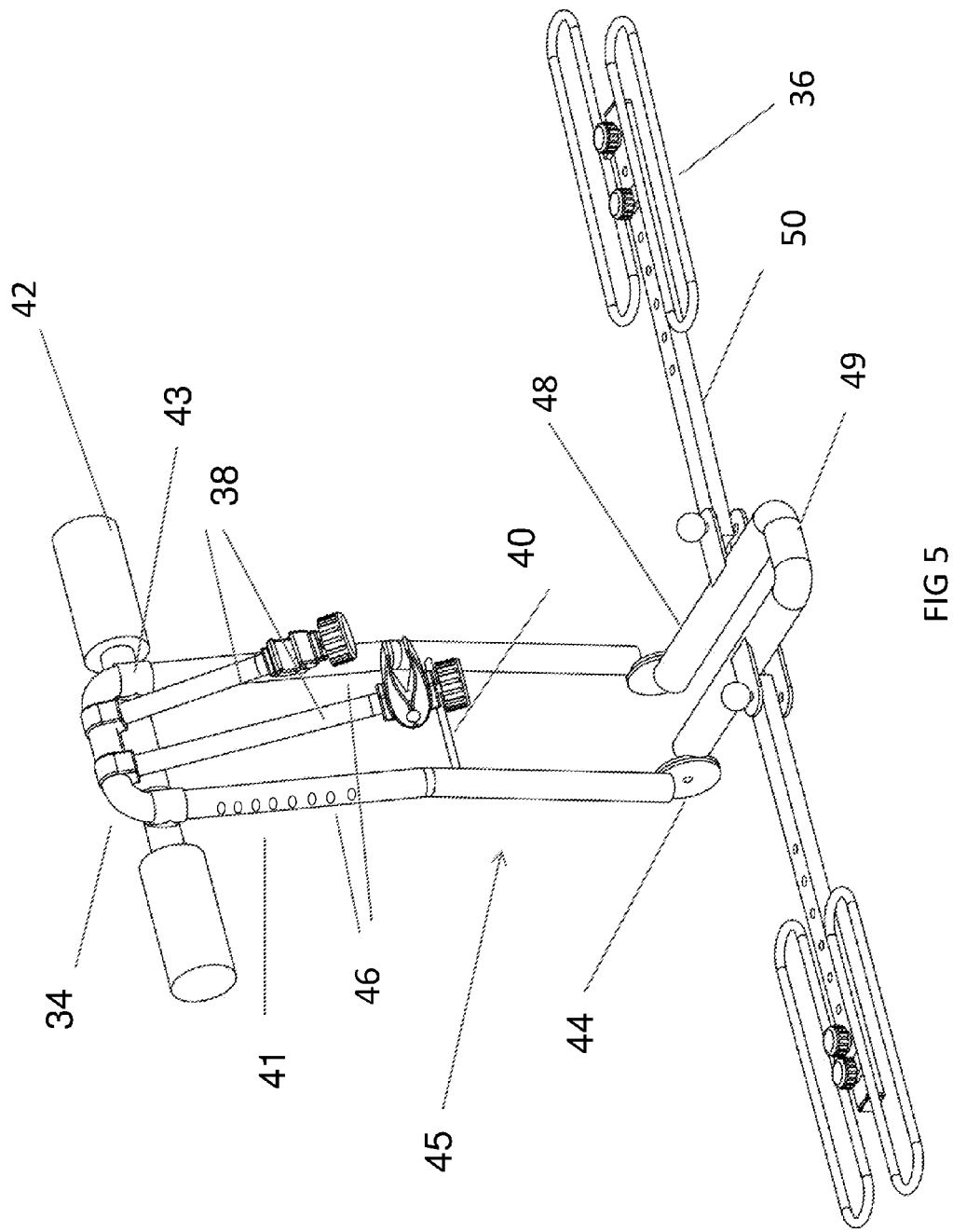
FIG. 5 illustrates perspective view of the arc sub assembly of carrier unit external part according to some embodiments of the present invention.
Figure 6:
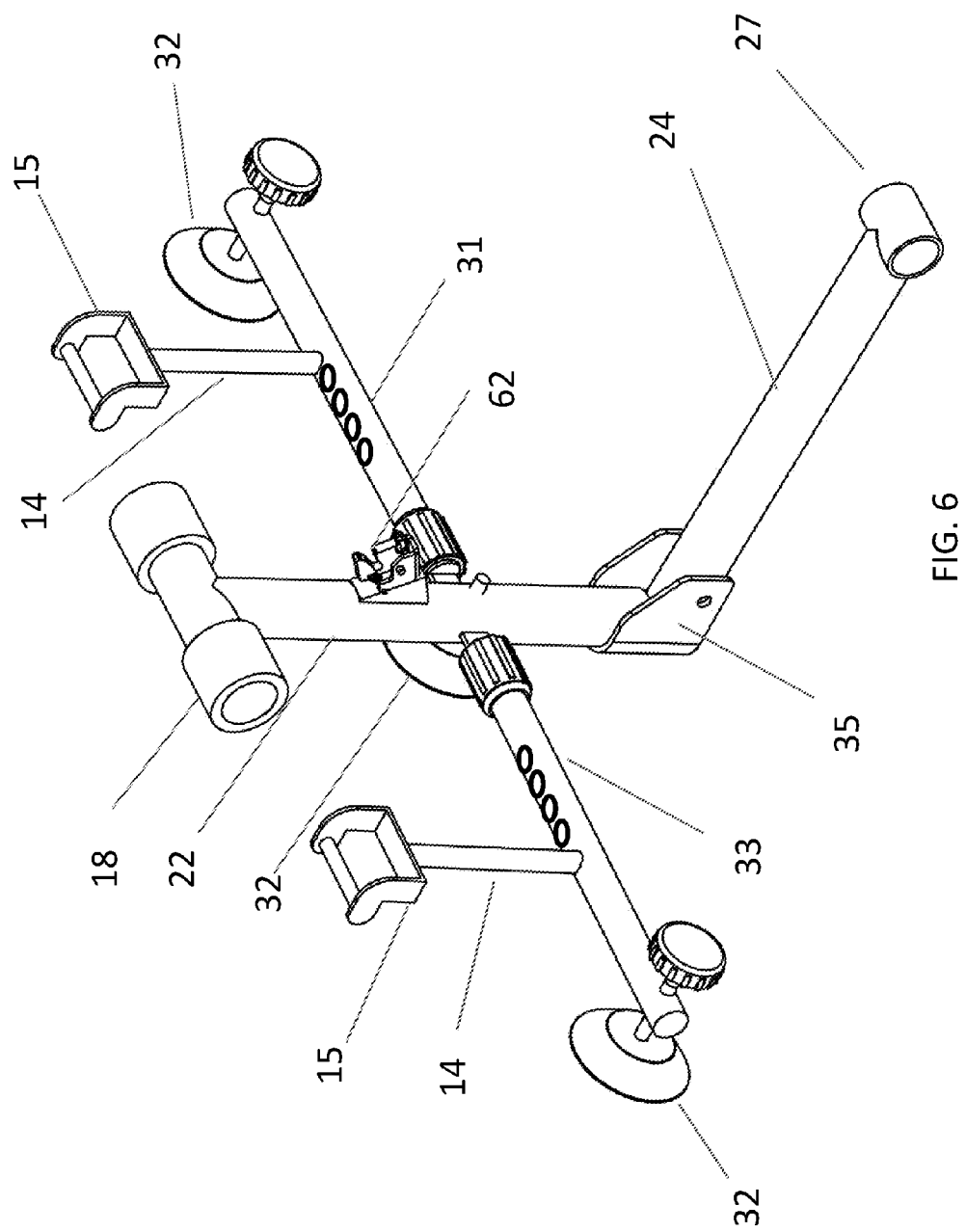
FIG. 6 illustrates perspective view of the swing sub assembly of carrier unit external part according to some embodiments of the present invention.

FIGS. 2 and 3 illustrates a perspective view of the carrier unit where the inner part 10 is installed in the vehicle trunk and the external part is in an unlocked position according to some embodiments of the present invention. The carrier unit according to some embodiments of the present invention is comprised of an inner part designed to fit in the vehicle trunk for creating an anchor base for connecting the external part of the carrier unit. The inner part 10 and the external part 12 are attached by connector such as the metal bracket 16 and the connector element 15. The external part includes a main support sub-assembly 30 (as seen in FIG. 6) and an arc support sub-assembly 20 (as seen in FIG. 5), the sub assemblies are interconnected by lock 62 and the rotating axis 27&49

The main support sub-assembly is comprised of three lower support elements 32 to be pressed against the lower part of the vehicle/bumper, which can be installed on different locations along each of the two horizontal rods 31 and 33 (the rods may implemented as pipes as seen in the drawing). These two rods are rotatably connected to the vertical rod 22, enabling them to be locked in perpendicular position to the vertical rod 22 or to be folded when not in use. Connecting bars 14 are threaded rods ending with connecting elements 15 on the top, and have a nut and screw connection with rods 31, 33 at the bottom. This connection allows adjusting the heights of the connecting elements 15 above rods 31, 33. Additionally, the connecting bars 14 can be connected on different locations along the rods 31 and 33, by corresponding holes.

A lower horizontal rod 24 ends with a hollow vertical pipe 27 on one end for connecting the arc support subassembly 20, and a sheet metal connector 35 on the opposite end. The lower horizontal rod 24 is rotatably connected to the sheet metal connector 35 in order to allow a folding position (see 046 Driving with no load position). The vertical rod 22 has a fixed connection with the sheet metal connector 35. The vertical rod 22 ends with T shaped rod having soft covers 18 for contacting the arc support sub-assembly 20 to the main support subassembly 30 by interlocking between the sub assemblies. On the vertical rod 22 is installed a lock 62, optionally a latch mechanism, which interlocks with the rod 40 of the arc sub-assembly.)

Figure 4:
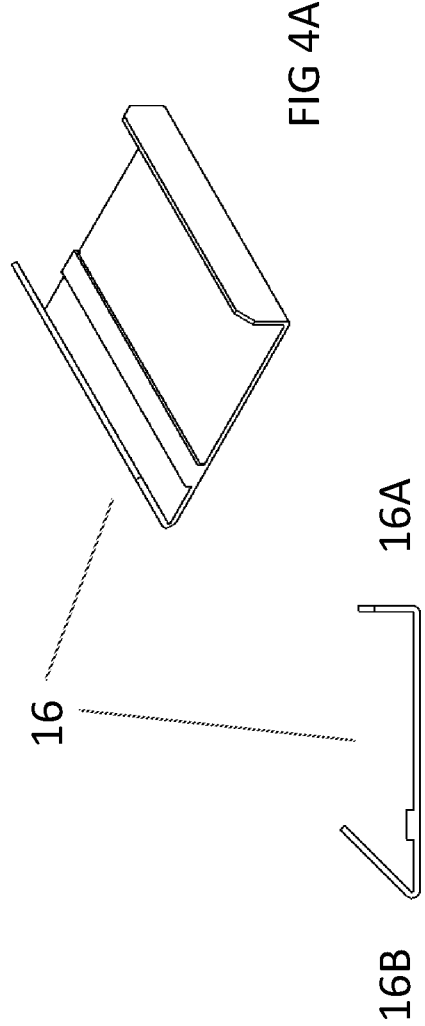
FIG. 4 illustrates perspective view of metal bracket according to some embodiments of the present invention.

FIG. 4 illustrates side view of anchor bracket according to some embodiments of the present invention. The anchor shape is design on end 16A to be pressed to the trunk lid seal of the vehicle trunk and on the other end 16B, having a folded edge to be engaged to the connecting elements 15 at the arc support sub assembly.

FIG. 4A illustrates perspective view of the metal bracket according to some embodiments of the present invention.

FIG. 5 illustrates perspective view of the arc sub assembly of carrier unit external part according to some embodiments of the present invention. The arc support sub assembly 20, is comprised of two U shaped hollow pipes, rotatably interconnected, to enable folding of the sub assembly. The lower U shaped hollow pipe 48 is connected at one end to the hollow pipe 27 (having wider diameter than the lower U shaped hollow pipe 49) of the main support subassembly 30, to create a rotatable axis, and the opposite end to axis 44 for connecting to the vertical U shaped hollow pipe 45. On the upper arc part 34 of the vertical U shaped hollow pipe 45 are installed two connectors 38 for securing the bicycle (the connectors are rotatable around upper arc part) and two horizontal support bars 42. The bars 42 are covered by soft covers, and can slide along the two vertical arms 46 (which are attached to the top part 34) and get locked in each one of the sets of sockets 41 with a plunger mechanism 43 which is placed on the horizontal support bars 42. The support bars are pressed against the upper part of the vehicle trunk. In between the vertical U shaped hollow 46 is connected a locking rod 40, intended to be inserted into lock 62 of the main support sub assembly 30. On the lower U shaped hollow pipe 48, are installed side horizontal bars 50, oriented in perpendicular to the lower horizontal pair of bars, connected to four elliptical bases, intended for placing the wheels of the bicycles. The connection of the bars may use screws and can be adjusted on different locations along the rods, by corresponding holes. The bars may be rotatably connected to the lower U shaped hollow pipe 48, enabling to fold the rods when not in use.

FIG. 6 illustrates perspective view of the main support sub assembly 30 of the carrier unit external part according to some embodiments of the present invention. The main support sub-assembly is comprised of three lower support elements 32 to be pressed against the lower part of the vehicle/bumper, which can be installed on the different locations along each of the two horizontal rods 31 and 33. These two rods are rotatably connected to the vertical rod 22, enabling them to be locked in perpendicular position to the vertical rod 22 or to be folded when not in use. Connecting bars 14 are threaded rods end with connecting elements 15 on the top, and have a nut and screw connection with rods 31, 33 at the bottom. This connection allows adjusting the heights of the connecting elements 15 above rods 31, 33. Additionally, the connecting bars 14 can be connected on different locations along the rods 31 and 33, by corresponding holes. A lower horizontal rod 24 ends with a hollow vertical pipe 27 on one end for connecting as one axis (with U shaped hollow pipe top 49) with the arc support subassembly 20, and a sheet metal connector 35 on the opposite end. The lower horizontal rod 24 is rotatably connected to the sheet metal connector 35 in order to allow a folding position (see 022 Driving with no load position). The vertical rod 22 has a fixed connection with the sheet metal connector 35. The vertical rod 22 ends with T shaped rod having soft covers 18 for contacting the arc support sub-assembly 20 to the main support subassembly 30 by interlocking between the sub assemblies. On the vertical rod 22 is installed a lock 62, optionally a latch mechanism, which interlock with the rod 40 of the arc sub-assembly.

Figure 7A:
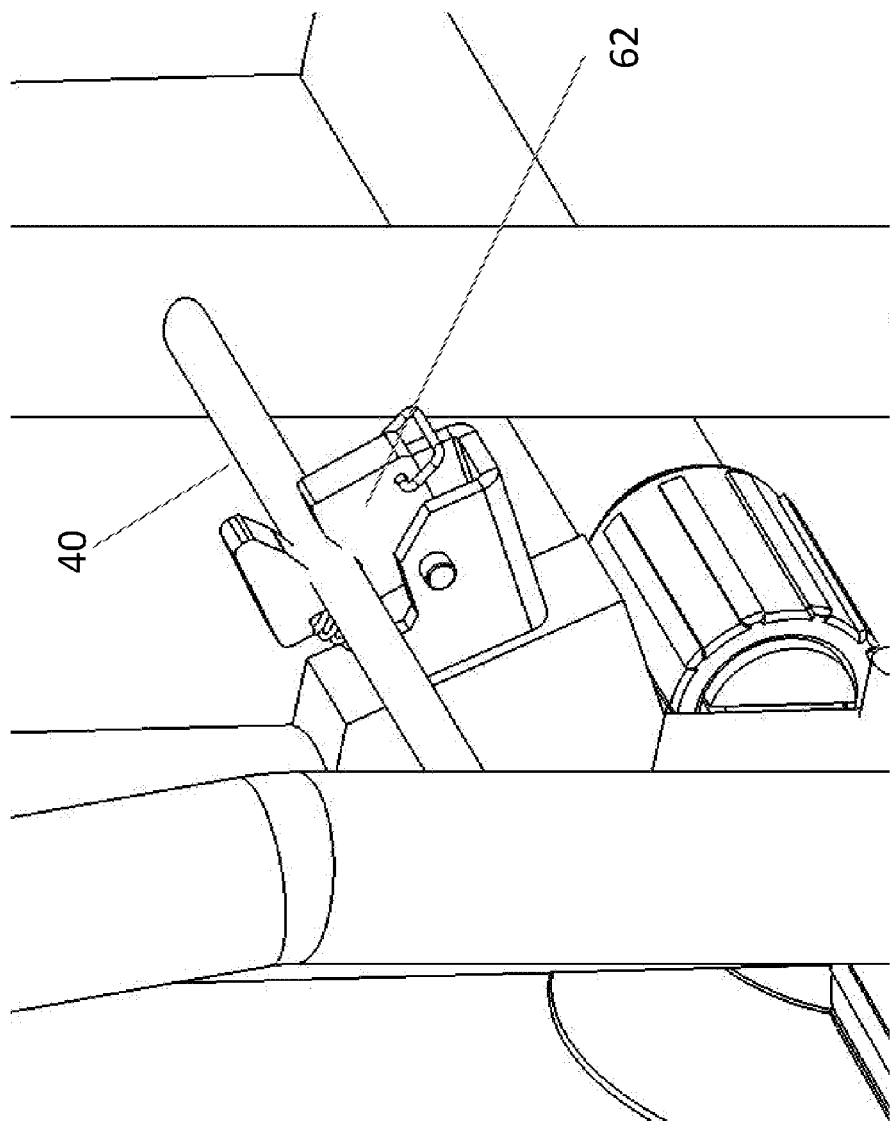
FIG. 7A illustrates perspective enlarged view of connecting mechanism of the arc sub assembly and the main support sub assembly according to some embodiments of the present invention.

FIG. 7 illustrates perspective view of the carrier unit external part comprising integration of the arc support sub assembly and the main support sub assembly in the lock position according to some embodiments of the present invention. The two integrated sub assemblies construct one carrier assembly (the external part), having one rotatable axis 27 and 49, and a locking mechanism 62 (see FIG. 7A), for securing the two sub assemblies at lock position.

FIG. 7A illustrates perspective enlarged view of locking mechanism of the arc sub assembly and the main support sub assembly according to some embodiments of the present invention.

Figure 8B:
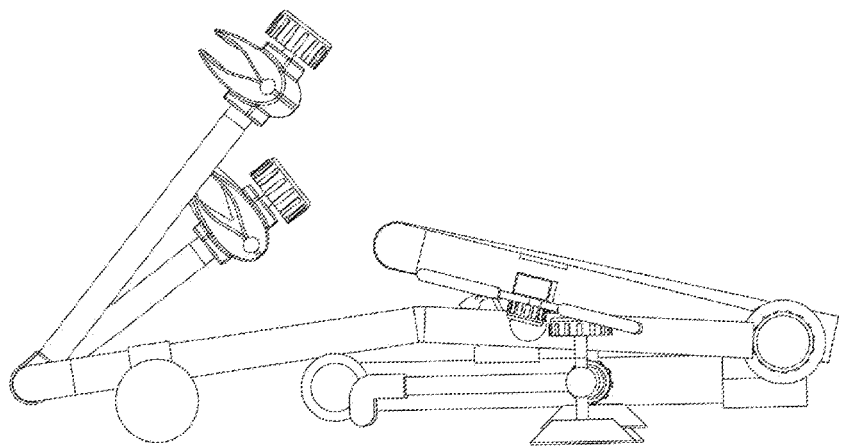
FIG. 8 illustrates perspective view of the arc sub assembly and the main support sub assembly in a folded state according to some embodiments of the present invention.
Figure 8A:
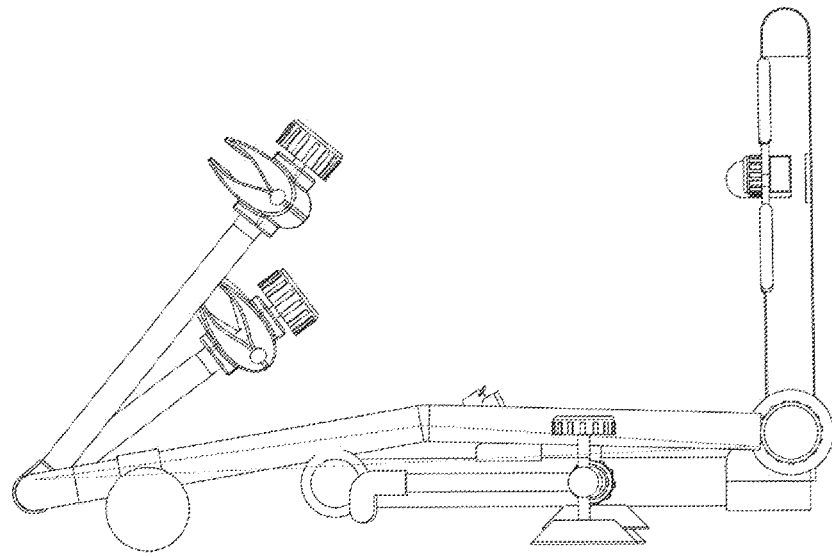

FIGS. 8A, and 8B illustrate side view of the arc sub assembly and the main support sub assembly in different folding states according to some embodiments of the present invention.

Figure 9:
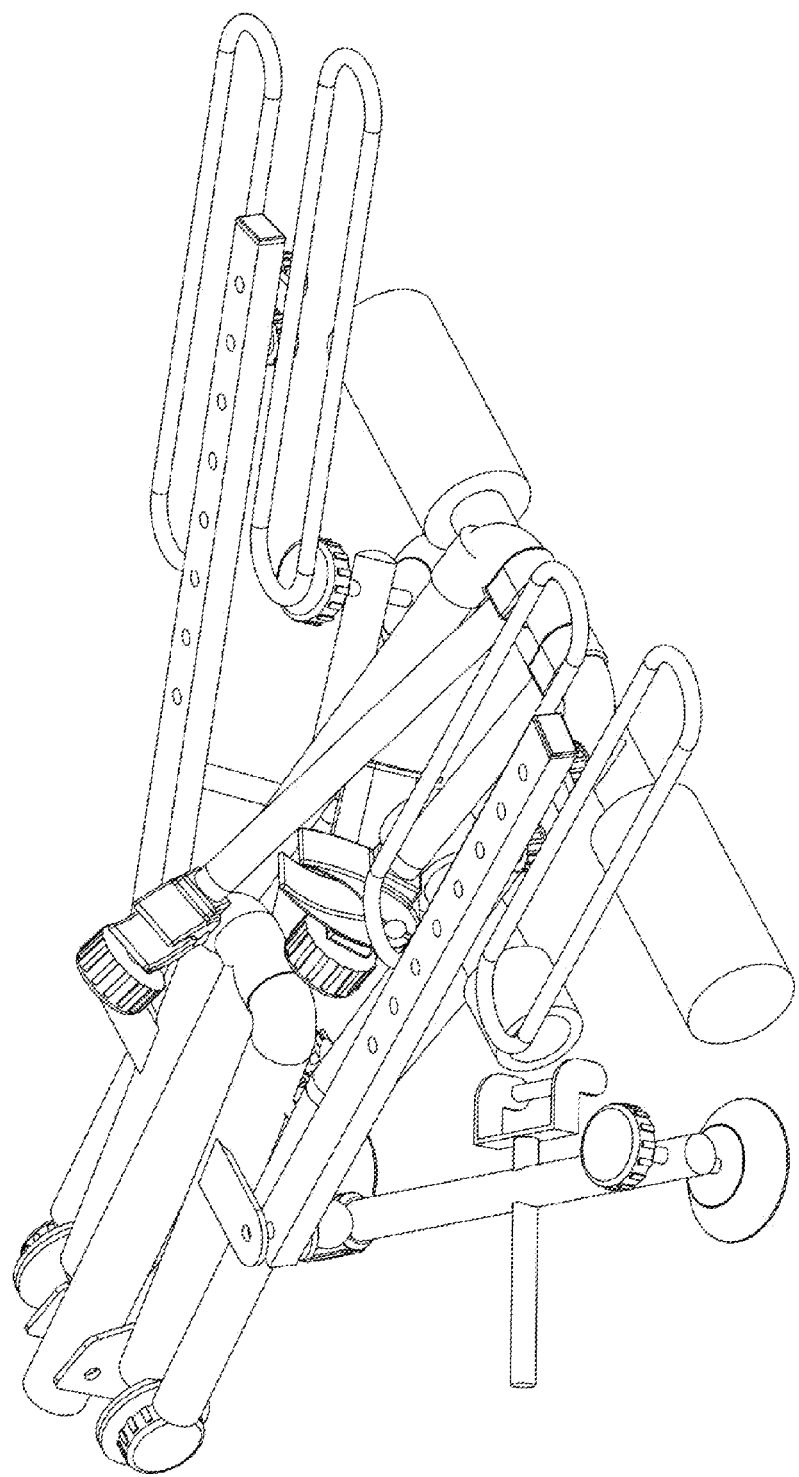
FIG. 9 illustrates perspective view of the carrier unit external part attached to the vehicle in unloaded and non locked state according to some embodiments of the present invention.

FIG. 9 illustrates perspective view of the arc sub assembly and the main support sub assembly in a folded state according to some embodiments of the present invention. In the folded state all part which have rotatable connections, are folded toward collapsible state minimizing the size of the carrier unit.

Figure 11:
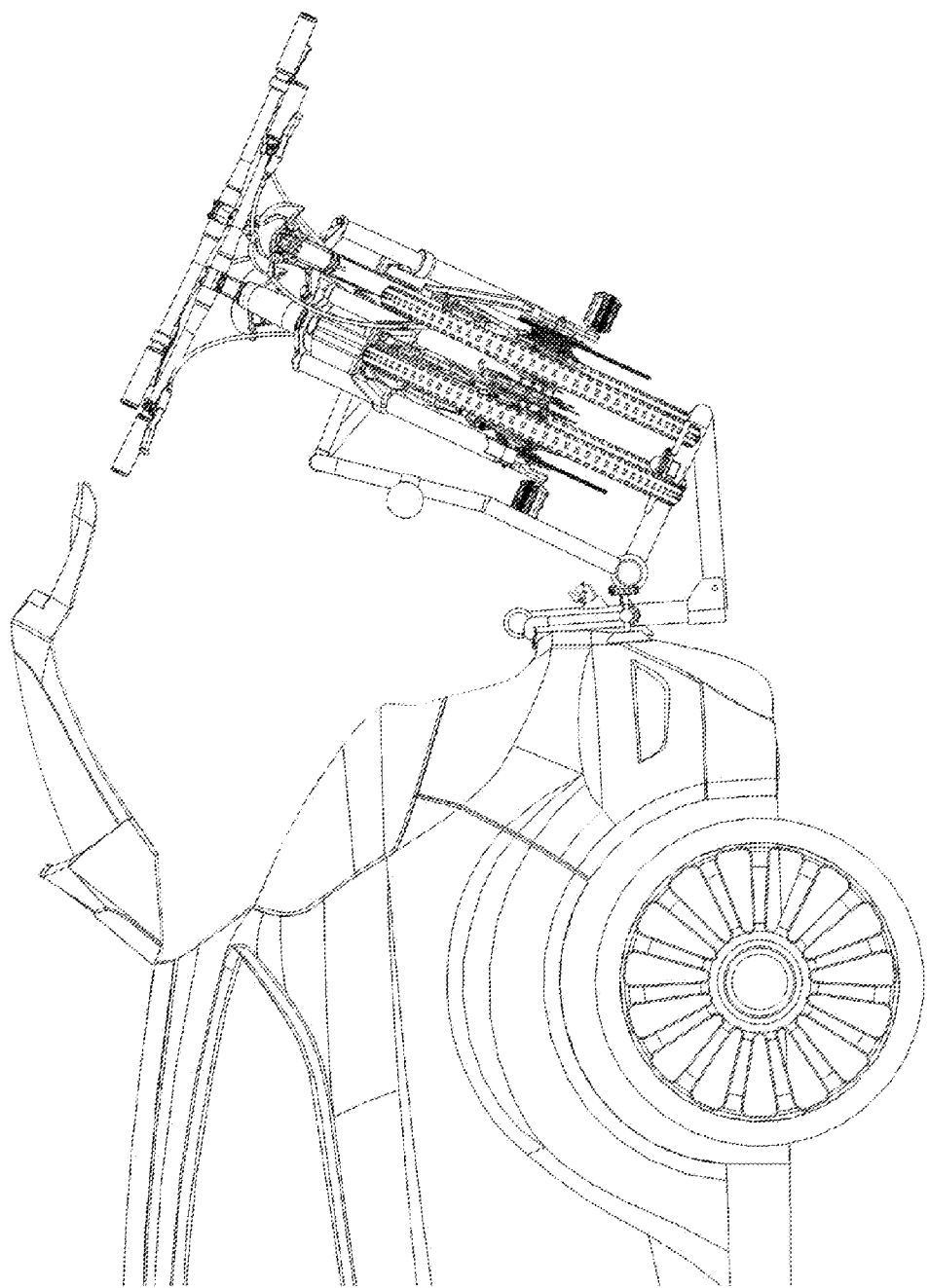
FIG. 11 illustrates perspective view of of carrier unit external part attached to the vehicle in loaded and non locked state according to some embodiments of the present invention.

FIG. 11 illustrates side view of the carrier unit external part attached to the vehicle in unloaded and locked state (Driving with no load) according to some embodiments of the present invention.

Figure 12:
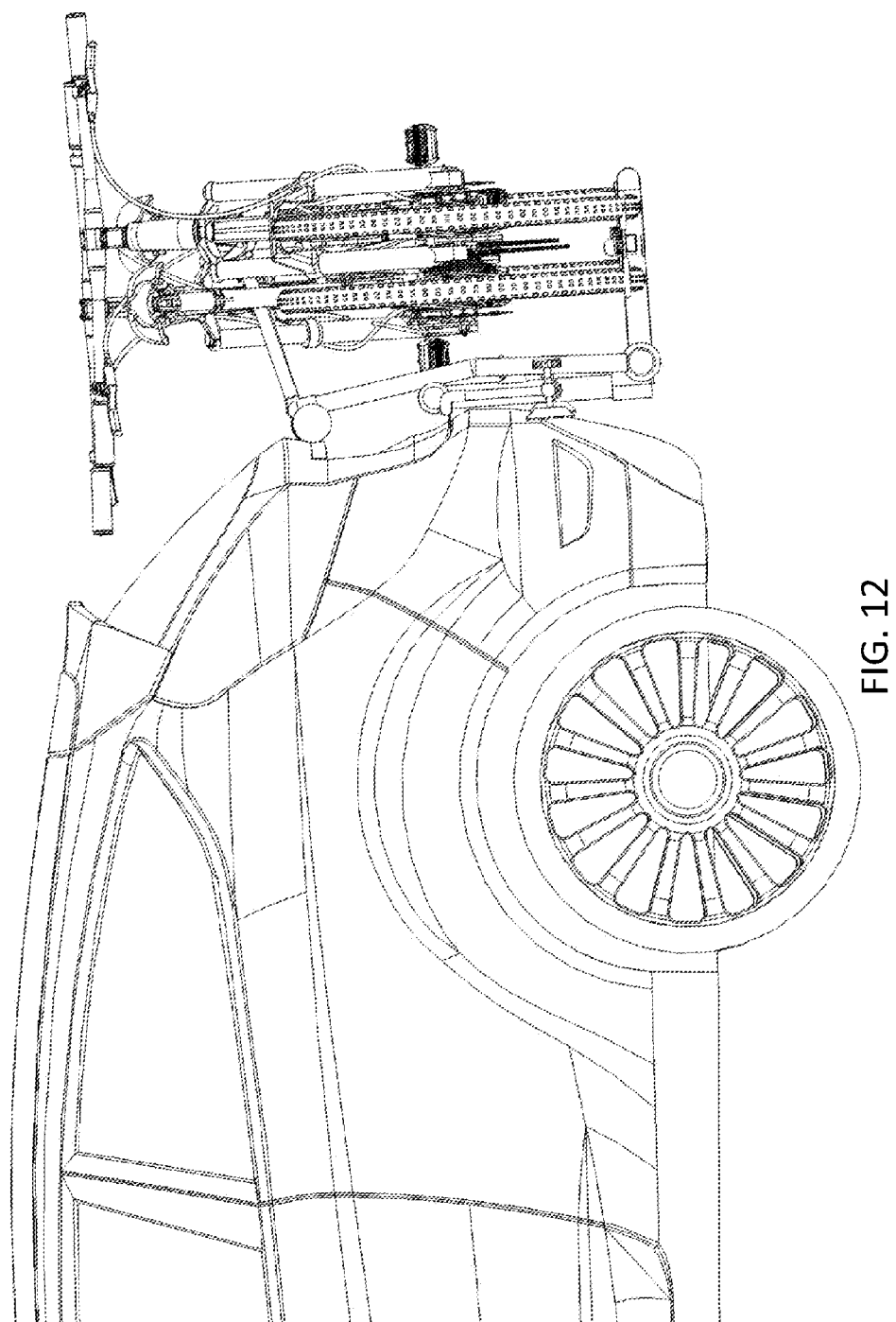
FIG. 12 illustrates perspective view of of carrier unit external part attached to the vehicle in loaded and locked state according to some embodiments of the present invention.

FIG. 12 illustrates side view of carrier unit external part attached to the vehicle in loaded and non locked state (Trunk door opened) according to some embodiments of the present invention.

Figure 13:
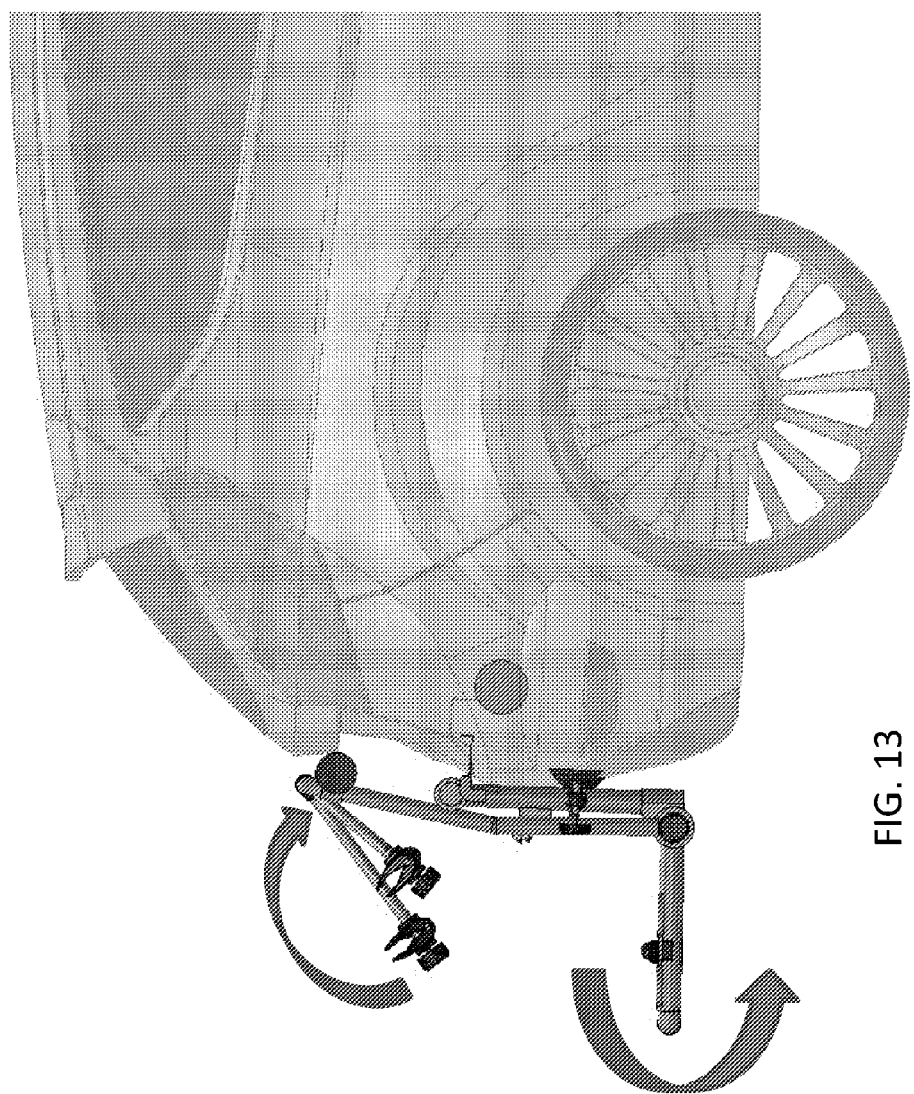
FIG. 13 illustrates a cross section view of carrier unit inner part according to some embodiments of the present invention.

FIG. 13 illustrates side view of carrier unit external part attached to the vehicle in loaded and locked state (Loading position) according to some embodiments of the present invention.

Figure 14:
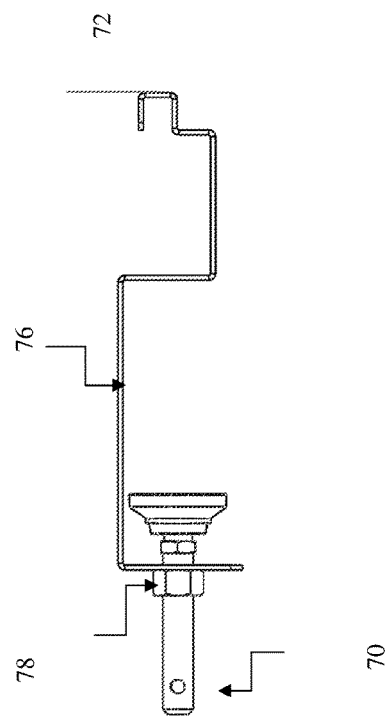
FIG. 14 illustrates perspective view of metal bracket according to some embodiments of the present invention.

FIG. 14, illustrates a side view of carrier unit inner part according to some embodiments of the present invention. According to this embodiment the inner part functions as the anchor connection, for the external part. The inner part is a bracket 76 designed to fit the edge of the vehicle trunk, such that one edge of the bracket is located inside the trunk, and the opposite edge is outside the trunk shaped to be engaged to the external part.

Figure 15:
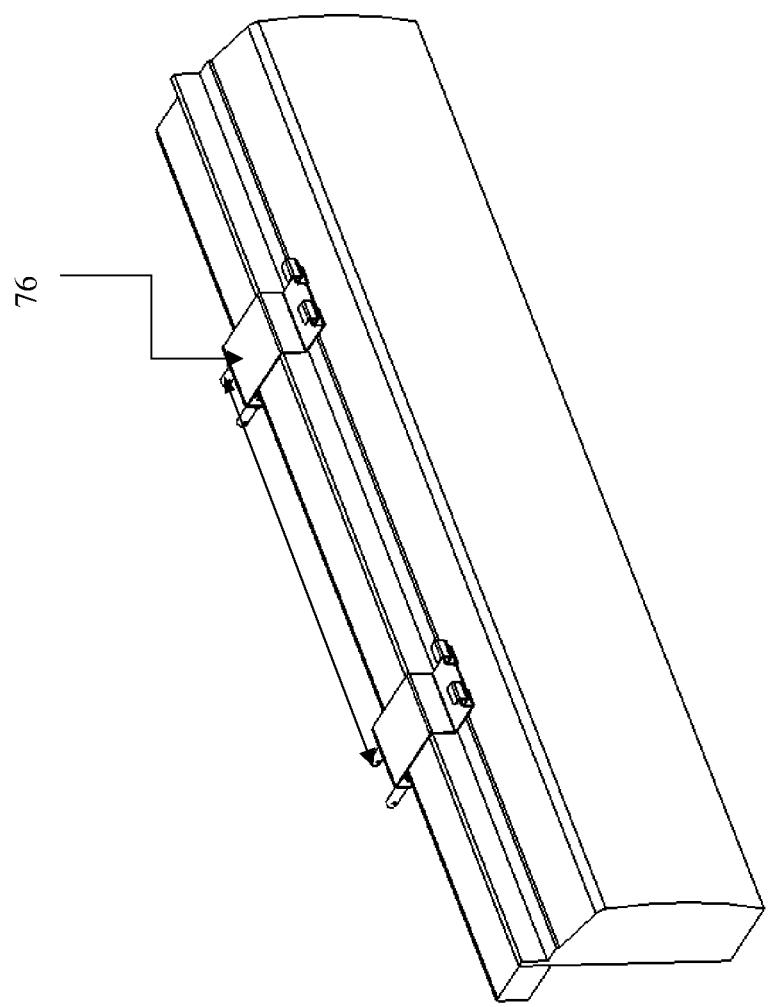
FIG. 15 illustrates a perspective view of carrier unit inner part according to some embodiments of the present invention.

FIG. 15 illustrates perspective view of bracket 76 installed on the vehicle trunk edge, according to some embodiments of the present invention.

Figure 16:
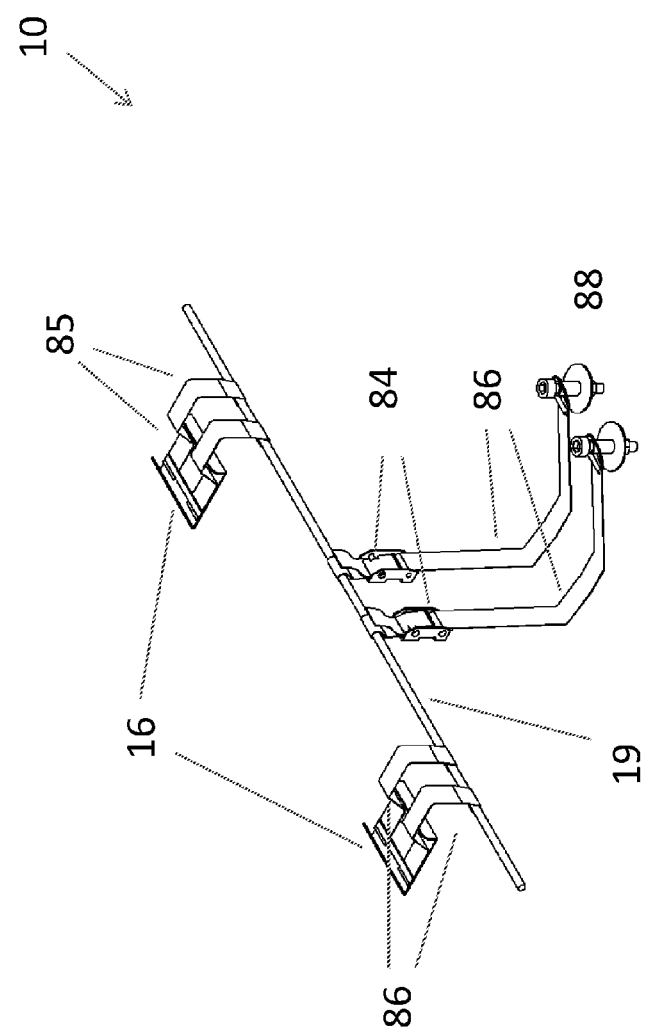
FIG. 16 illustrates a perspective view of carrier unit inner part according to some embodiments of the present invention.

FIG. 16 illustrates a perspective view of carrier unit inner part according to some embodiments of the present invention. According to this embodiment, the inner part is comprised of long straps 86, connected on one end to the screw and nut connection 88 which can be attached to an object within the vehicle such as the spare tire within the vehicle trunk. On the other end the strap is connected to a stretching elongated rod 19 (via buckle 84) which is designed to connect between these straps and the brackets 16 via four sets of short straps 85.

Figure 17:
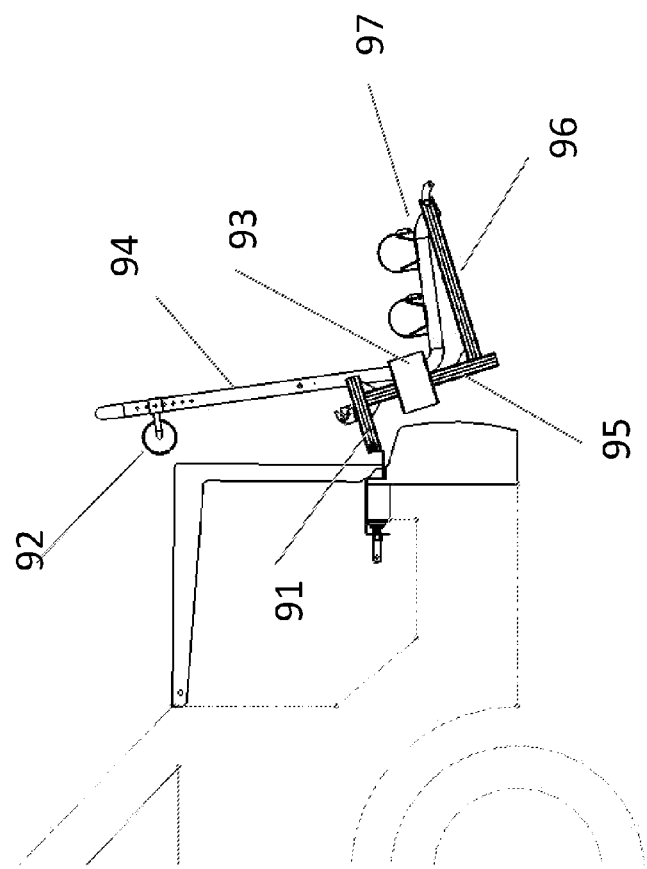
FIG. 17 illustrates a perspective view of carrier unit external part installed on a vehicle according to some embodiments of the present invention
Figure 17B:
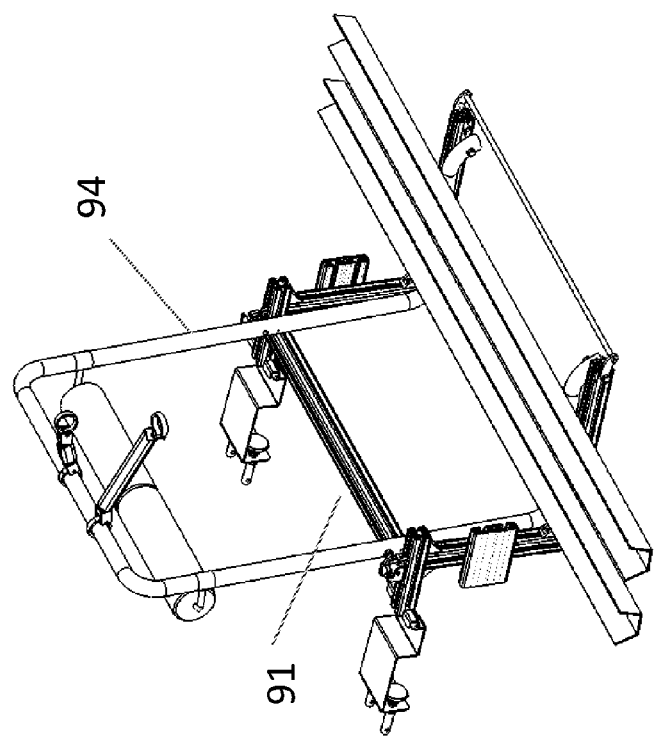
Figure 17A:
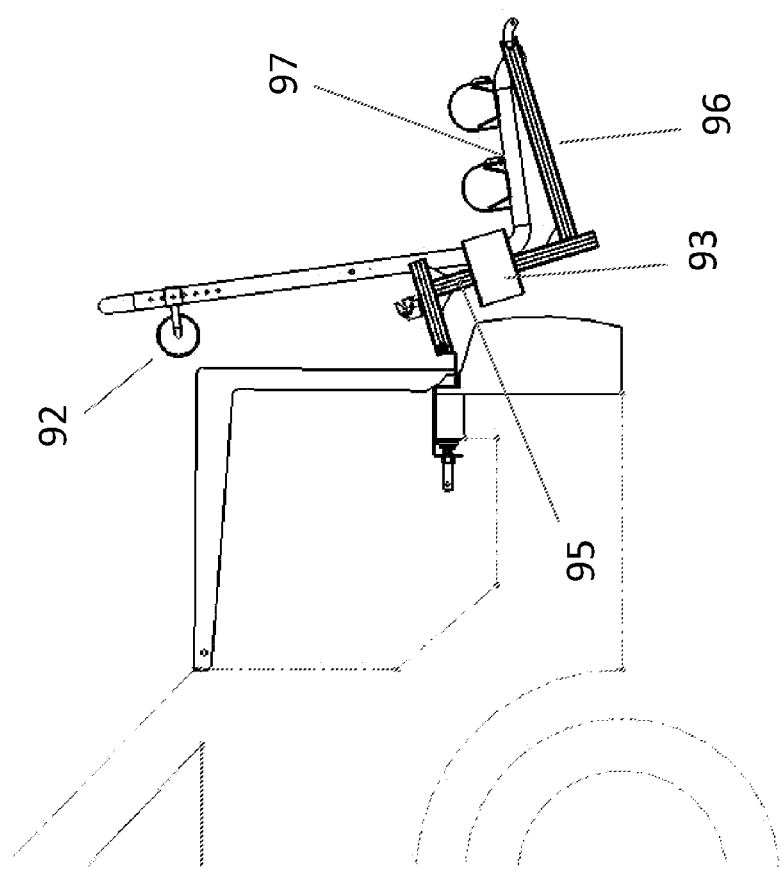

FIGS. 17A&17B illustrate a side and perspective view respectively of carrier unit internal and external parts installed on a vehicle according to some embodiments of the present invention. According to this embodiment the main support assembly is comprised of: three interconnects rods, back rod 91 for engaging the inner part, rod 95 on which is installed lower support element 93 and horizontal rod 96 for supporting the arc sub assembly. The arc support sub assembly is comprised of horizontal rod 97 for supporting the load, rotatably connected to a vertical rod 94, on which is installed a support arc 92, pressed against the upper part of the trunk.

| REFERENCE NUMERALS IN THE DRAWINGS | |
|---|---|
| 10 | Inner part |
| 12 | External part |
| 14 | Connecting bar |
| 15 | Connecting elements |
| 16 | Bracket |
| 17 | Strap |
| 18 | Soft covers |
| 19 | stretching elongated rod |
| 20 | Arc support sub-assembly |
| 22 | Vertical rod |
| 24 | Lower horizontal rod |
| 25 | U shaped pipe vertical part |
| 26 | Second leg |
| 27 | Hollow vertical pipe |
| 28 | Side horizontal bars |
| 29 | Sheet metal connector |
| 30 | Main support sub-assembly |
| 31 | Middle horizontal rod |
| 32 | Lower support elements |
| 34 | upper arc part |
| 38 | Connectors |
| 40 | Locking rod |
| 41 | Set of sockets |
| 42 | Horizontal support bars |
| 43 | Plunger mechanism |
| 44 | Axis |
| 46 | Vertical U shaped hollow rod |
| 48 | Lower U shaped hollow rod |
| 62 | lock |
| 70 | Trunk |
| 72 | Trunk lid seal |

What is claimed is:

1. A carrier device for carrying a load, said carrier device is configured for clamping to a trunk of a vehicle and for loading a load thereto for carrying thereof, said carrier comprising:
    at least one inner part configured for clamping the vehicle trunk, creating an anchor point for supporting an external part; and
    at least one external part for holding said load, said external part connects to said at least one inner part via at least one anchor connector supported by said anchor point, where said external part includes at least one main support sub-assembly having at least one support element pressed against to the lower bumper of the vehicle and an arc support sub-assembly having an upper arc to be pressed against the upper rear part of the vehicle;
    wherein the main support subassembly and the arc support subassembly are interconnected partly via a rotatable axis, such that the support arch assembly, is rotated and locked to the main support subassembly, thus pressing the upper arc of the arc sub-assembly against the upper rear part the vehicle.

2. The carrier device of claim 1 further comprising a lock mechanism between the main support subassembly and the arc support subassembly.

3. The carrier device of claim 1, wherein the arc support sub assembly is comprised of two U shaped rods interconnected by rotatable axis, enabling to fold the carrier unit.

4. The carrier device of claim 1, wherein the main support sub assembly comprises at least one connector unit for engaging to at least one anchor connector, wherein the location of said at least one connector unit can be adjusted.

5. The carrier device of claim 1, wherein the main support sub assembly comprises a lower horizontal pipe having a hollow vertical pipe at the edge, said a hollow vertical pipe engages with a hollow pipe of the arc sub assembly, thus creating a rotatable axis between the main support sub assembly and the arc support assembly.

6. The carrier device of claim 1, wherein the main support sub assembly comprises a vertical bar having a T shaped edge, covered by soft material for supporting the arc sub-assembly.

7. The carrier device of claim 6, wherein the main support sub assembly further comprises one at least one middle horizontal bar, connected vertically to the vertical bar, wherein on said middle horizontal bar are installed the support elements which are pressed against to the lower bumper of the vehicle and at least one connector element which engage at least one anchor connector.

8. The carrier device of claim 1 wherein the inner part includes at least one strap attached on one end to the connector on the second end to an inner support element pressed against an inner back wall of the vehicle.

9. The carrier device of claim 8, wherein the inner support element is a stretching elongated rod, designed to be to fit in the vehicle trunk, such as the rod is pressed against the rear inner wall of the trunk.

10. The carrier device of claim 8, wherein the inner support is connected to a part of the vehicle body.

11. The carrier device of claim 1 wherein the connector is a metal bracket design to fit in and pressed against the rubber trunk lid seal installed on the vehicle trunk edge.

12. The carrier device of claim 1 wherein the anchor connector is a bracket design to fit in on the vehicle trunk edge.

13. The carrier device of claim 1 wherein the anchor connector is located outside the vehicle.

14. The carrier device of claim 1 wherein the arch support sub assembly comprise at least one connector designed to be engaged to a bicycle.

15. The carrier device of claim 1 wherein the arch support sub assembly comprise at least one bar designed support at least one bicycle wheel.

16. The carrier device of claim 1 wherein the inner part and anchor connectors are one part of bracket designed to fit on the vehicle trunk edge.

17. A carrier device for carrying a load, said carrier device is configured for clamping to a trunk of a vehicle and for loading a load thereto for carrying thereof, said carrier comprising:
at least one inner part configured for clamping the vehicle trunk, creating an anchor point for supporting an external part; and
at least one external part for holding said load, said external part connects to said at least one inner part via at least one anchor connector supported by said anchor point, where said external part includes at least one main support sub-assembly having at least one support element pressed against to the lower bumper of the vehicle and an arc support sub-assembly having an upper arc to be pressed against the upper rear part of the vehicle wherein the main support sub assembly comprises a lower horizontal pipe having a hollow vertical pipe at the edge, said a hollow vertical pipe engages with a hollow pipe of the arc sub assembly, thus creating a rotatable axis between the main support sub assembly and the arc support assembly.

18. A carrier device for carrying a load, said carrier device is configured for clamping to a trunk of a vehicle and for loading a load thereto for carrying thereof, said carrier comprising:
at least one inner part configured for clamping the vehicle trunk, creating an anchor point for supporting an external part; and
at least one external part for holding said load, said external part connects to said at least one inner part via at least one anchor connector supported by said anchor point, where said external part includes at least one main support sub-assembly having at least one support element pressed against to the lower bumper of the vehicle and an arc support sub-assembly having an upper arc to be pressed against the upper rear part of the vehicle;
wherein the arc support sub assembly is comprised of two U shaped rods interconnected by rotatable axis, enabling to fold the carrier unit.

* * * * *